United States Patent

Sicard

[15] 3,674,154

[45] July 4, 1972

[54] FILTRATION APPARATUS

[72] Inventor: Marcel Clarence Sicard, Cheshire, Conn.

[73] Assignee: AMF Incorporated

[22] Filed: May 20, 1968

[21] Appl. No.: 730,494

[52] U.S. Cl. .............................................210/456, 210/499
[51] Int. Cl. ........................................................B01d 29/30
[58] Field of Search.....................210/414, 456, 446, 499, 65

[56] References Cited

UNITED STATES PATENTS 3,109,809  11/1963  Verrando...........................210/456 X

FOREIGN PATENTS OR APPLICATIONS 1,098,513  11/1955  France..................................210/499
  931,506  8/1955  Germany..............................210/499

OTHER PUBLICATIONS

German Printed Application 1,142,562, January 1963

Primary Examiner—J. L. Decesare
Attorney—George W. Price and Murray Schaffer

[57] ABSTRACT

A fluid wash filter in which the stream of fluid is partially diverted transversely through a screen arranged along the axis of flow including means for reducing the concentration of contaminant along the screen.

1 Claim, 4 Drawing Figures

INVENTOR.
MARCEL CLARENCE SICARD
BY
ATTORNEY

FILTRATION APPARATUS

The present invention relates to filters for fluids and, in particular, to the structure and use of wash filters.

Wash filters are frequently used where some portion of a stream of liquid must be diverted, filtered and employed for some purpose other than that of the mainstream. A simple example, sufficing as an illustration, may be related to jet aircraft operation. It is commonplace to divert a portion of a pressurized stream of engine fuel, use it as an operating fluid for some control mechanism and then return it to the main volume of fuel. For the control function involved, the diverted fuel must be much cleaner than the parent stream and accordingly must be filtered by a special mechanism generally a wash filter.

A wash filter is, in essence, made by forming a portion of the wall of a fluid-carrying duct of a permeable material and diverting some of the fluid therethrough. Dirt is separated through the surface of the permeable wall and swept or washed away, without pause, by the mainstream of fluid. When a filter of this type is properly designed, it will retain little dirt and function within its range of flows and pressures for prolonged periods. However, by the very nature of things some dirt will lodge in the pores of the permeable wall (usually a metallic screen) and, being retained, will reduce the filtering area and lead to ultimate plugging. The rate of plugging is dependent on the quantity of dirt presented to the screen; anything that reduces such quantity helps to reduce the size of a screen, needed for a given duty, to a minimum.

It is an object of this invention to provide a method of introducing a dirt contaminated stream to a wash filter in such a way as to minimize the dirt load presented to the filtering surface.

Another object is to provide in a wash filter a means of diverting dirt from the filtering surface so that the portion of dirt, in a given flow stream which is presented to the said surface, is appreciably less than the proportion of diverted fluid to through-passed fluid.

It is a further object to so modify a structural member of a wash filter that it will afford a dirt diverting function substantially without weight, size or cost penalty.

Other objects not expressly set forth above will become apparent on consideration of the following specification and claims together with the appended drawings.

Referring to the drawings.

Figure 1:
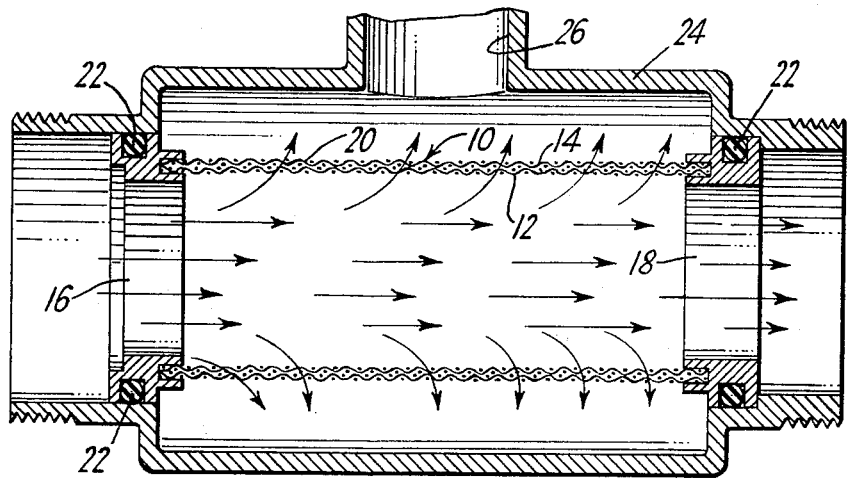
FIG. 1 is a longitudinal center-line section of a type of wash filter in everyday use.

Turning first to FIG. 1: the filtering member 10 comprises a multi-layer permeable tube of suitable perforate material, the inner screen 12 may be a rolled up sheet of woven wire mesh, suitably calendered if needed or it may be a rolled up sheet of electro-deposited metal, say nickel of a desired mesh. The inner screen 12 provides the filtering surface and is mechanically supported by an outer layer 14 of coarser and stronger perforated metal. These layers may be, and frequently are bonded together by brazing or sintering. The longitudinal seams are usually secured by welding. Each end of the member 10 is secured to a fitting, such as inlet fitting 16 and outlet fitting 18, which fittings hold the member 10 in its desired tubular form and also serve to mount the whole structure 20 in a conduit system of which it becomes part. Each of the fittings 16 and 18 carry an O-ring gasket 22 having sealing engagement with the respectively adjacent parts of the conduit.

The filter is conveniently mounted in a conduit section, such as shown by reference numeral 24, in which it may be sealed. The conduit section is also provided with an outlet 26 for the filtered fluid. The conduit section shown is schematic only and may be substituted for by any known suitable means.

Brief consideration of FIG. 1 will make it clear that the quantity of fluid-borne dirt presented to the screen 12 for interception thereby will be substantially proportional to the quantity of fluid diverted therethrough. In other words, if 25 percent of the total flow of fluid is diverted through screen 12, then approximately 25 percent of the dirt will be presented to the said screen, which in time may become plugged with pore trapped debris if not washed away. It must be kept in mind that wash removal of dirt is dependent on the drag of mainstream fluid on any given particle being greater than the drag thereon of fluid passing through the screen. At some point in the wash cleaning process, depending on the contamination of the fluid, it is possible to present such a moving (i.e. instantaneous) dirt load to the screen that the pressure drop across it, with consequent higher filtrate velocity, will cause the drag screenward to exceed the wash drag from the mainstream flow. Thus almost immediate plugging of the screen occurs. A corollary of this is that, for a given filtering area, the filtered fluid flow through the screen may be increased in some relationship to a decreased instantaneous dirt load of the mainstream at the filtering surface.

Figure 2:
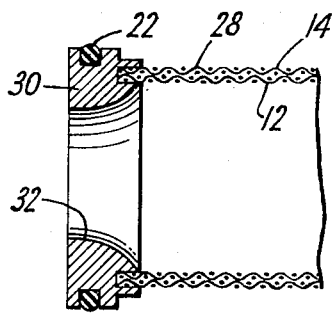
FIG. 2 is a fragmentary view of a wash filter similar to that shown in FIG. 1, but incorporating one form of the invention.

In FIG. 2 is shown a wash filter 28 embodying the present invention. It is similar in all respects to that shown in FIG. 1 except that the inlet fitting 30 serves as a stream diameter controller and has a substantially venturi-shaped passage with a throat 32, much smaller in diameter than the passage through fitting 16 of FIG. 1. The throat 32 expands smoothly in diameter so as to eliminate eddies until it is substantially equal to the inside diameter of screen 12. With this construction the stream of fluid, and its entrained dirt, is of reduced diameter as it passes through throat 32 and at the same time its velocity is increased. The fluid stream expands as it enters the filtering member 10 and the wash flow rate is the same in the device of FIG. 1 as the rate of diversion through the screen 12 may be. However, as the contaminant is generally much heavier than the fluid, it, by its inertia, tends to maintain the concentrated stream diameter imposed by the throat 32; this action very effectively reduces the dirt load on the screen.

Actual testing of devices built in accordance with this invention clearly demonstrate the important operating improvement afforded by this simple modification over these prior structures. The construction of FIG. 2 results in a decided nonuniform distribution of contaminant in the stream of fluid; it is largely concentrated in the center portion and is only lightly dispersed near the screen 12. However, because the fluid flows radially as it moves axially through the filter, the contaminant is ultimately redispersed and more of it is brought into contact with the screen, particularly in a long filter, than was the case nearer the inlet. This condition is rectifiable if a long filter is required as will later be explained with reference to FIG. 4.

Figure 3:
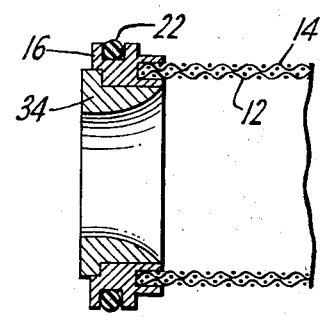
FIG. 3 is generally similar to FIG. 2 but depicts another embodiment of the invention.

The structure of FIG. 3 is essentially that of FIG. 1 in which has been added, at the inlet end, an insert 34 similar in stream concentrating form and function to the controller 30 of FIG. 2. This arrangement enables a manufacturer to modify a basic standard structure to varying customer requirements by the addition of a simple enterchangeable part.

Figure 4:
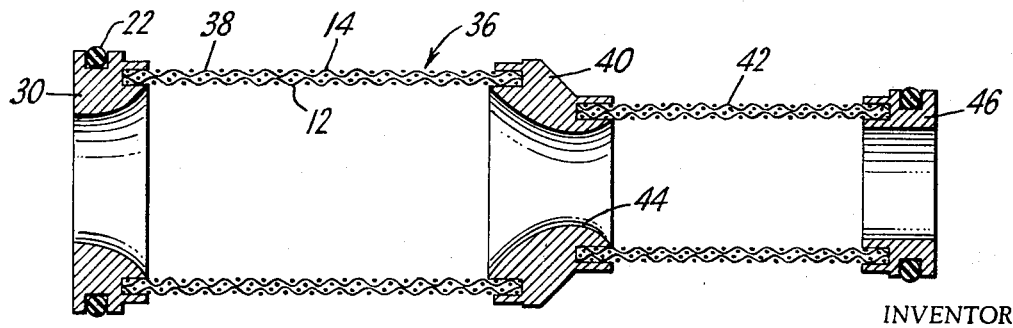
FIG. 4 shows still another embodiment of the invention as seen in another longitudinal center-line section. Throughout the drawings, like reference numbers indicate like parts.

FIG. 4 shows a multi-element wash filter 36 comprising a first portion 38, similar to the filter shown in FIG. 2 except the outlet fitting 18 of the latter is replaced by a coupling 40; it also comprises a permeable tube 42, smaller in diameter than tube 10 but otherwise like it. As shown in the drawing, coupling 40 supports the outlet end of tube 10 and the inlet end of tube 42 and has a venturi-shaped passage with a throat 44 whereby the fluid stream with its now decreased volume and its proportionately increased load of contaminant may have its original velocity restored and its contaminant re-concentrated away from the screen. An outlet fitting 46, similar in function and size, except diameter, to outlet fitting 18 is secured at the down-stream end of tube 42.

In each of the constructions of FIGS. 2, 3, and 4 steps are taken to keep at least an important proportion of the contaminant away from the diverted flow cleaning screens. This is done by causing the fluid stream entering the screen member involved to smoothly increase its cross-sectional area as it makes that entrance, whereby, due to inertial lag, the fluid-borne contaminants tend to remain mid-stream and away from the screen surfaces. It should be noted that the fluid stream may, as is most convenient, be brought to its pre-expansion dimensions either at the throat of the entrance to the screen, as occurs at the throat 44 in coupling 40 shown in FIG. 4, or at some remote point as might occur in a duct leading to the inlet fitting and which is indicated in that figure by broken lines at 46.

It will thus be seen that by the novel construction described, wash filters may be easily and simply produced which increase effective life and flow characteristics. It will be obvious that various changes and modifications may be made to the form of the device as shown and the method of wash filtration, all obtaining the beneficial results originating from the inertial concentration of contaminant within the mainstream. It is, therefore, intended that the present invention be limited only by the scope of the claims appended hereto.

What is claimed is:

1. A wash filter having two tubular filter members arranged in tandem and comprising, seriatim;
    a. an annular inlet fitting affording support for the inlet end of;
    b. a first filter tube having a foraminous wall supported at its outlet end by;
    c. an annular coupling affording support for the inlet end of;
    d. a second filter tube having a foraminous wall and a smaller diameter than said first filter tube; said inlet fitting having a divergent passage for conducting a diverging stream of fluid into said first tube, and; said coupling having a convergent-divergent passage contracting from its entrance facing said first tube to a throat of smaller diameter than the inside diameter of said second tube and expanding from said throat toward said second tube.

* * * * *